Sept. 9, 1947. J. E. MacADAMS 2,427,013
DENSITOMETER FOR MEASURING THE LIGHT TRANSMISSION
OF A FLUID WHILE SUBMERGED THEREIN
Filed Aug. 29, 1944 2 Sheets-Sheet 1
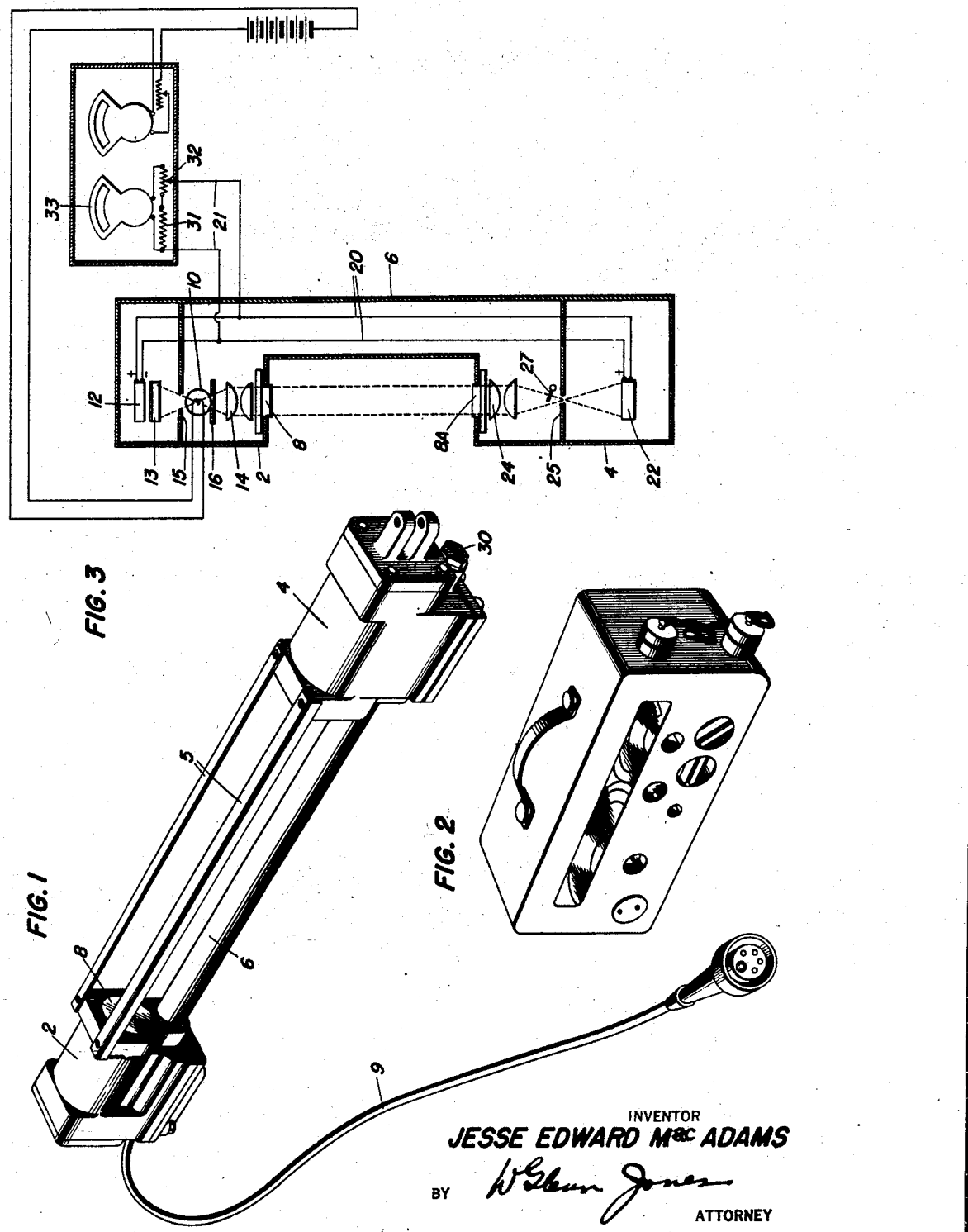
INVENTOR
JESSE EDWARD MacADAMS
BY
ATTORNEY Sept. 9, 1947.  J. E. MacADAMS  2,427,013
DENSITOMETER FOR MEASURING THE LIGHT TRANSMISSION
OF A FLUID WHILE SUBMERGED THEREIN
Filed Aug. 29, 1944  2 Sheets-Sheet 2
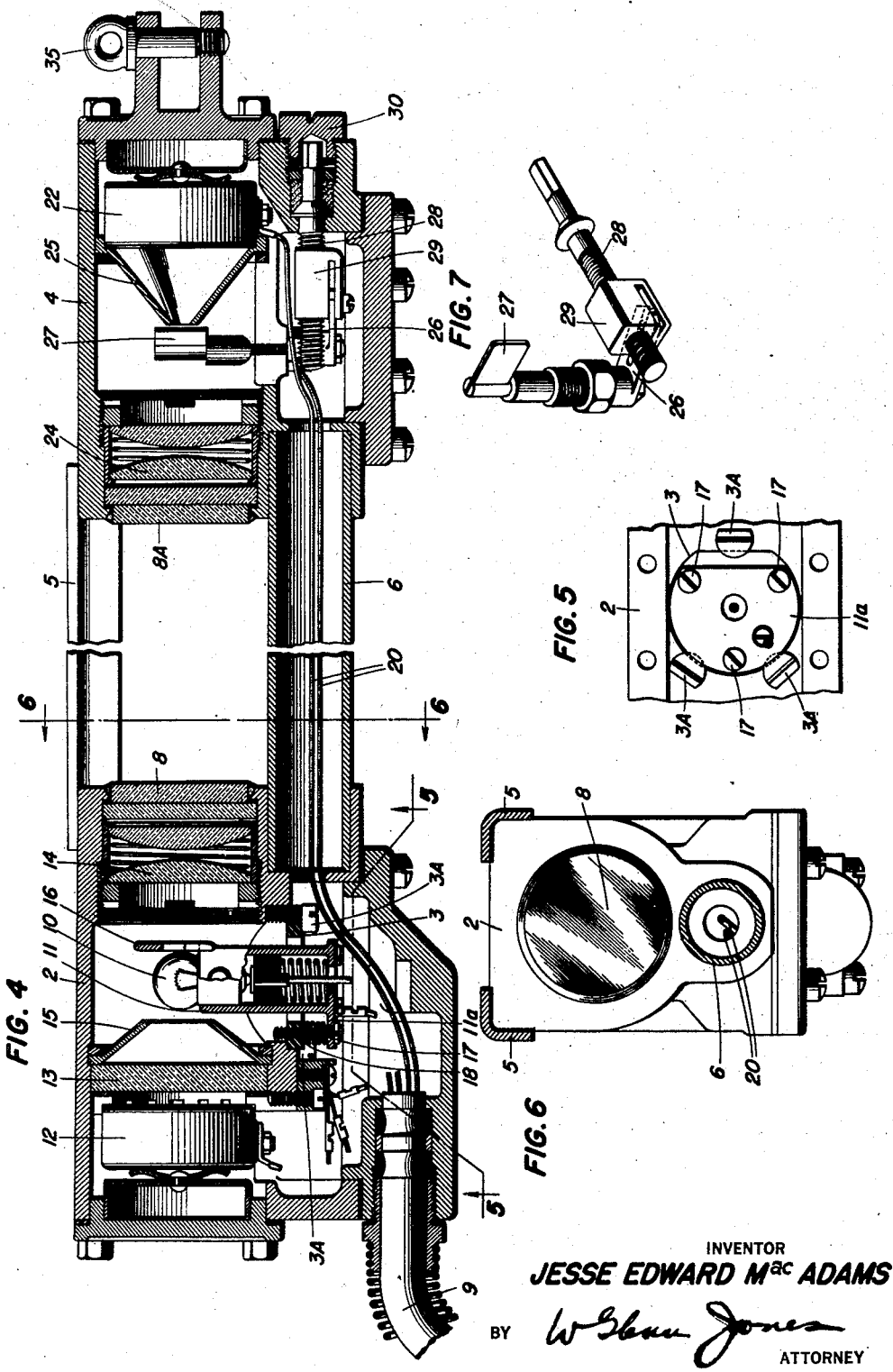
INVENTOR
JESSE EDWARD M<sup>ac</sup> ADAMS
BY
ATTORNEY Patented Sept. 9, 1947

2,427,013

UNITED STATES PATENT OFFICE 2,427,013

DENSITOMETER FOR MEASURING THE LIGHT TRANSMISSION OF A FLUID WHILE SUBMERGED THEREIN

Jesse Edward MacAdams, Cheverly, Md.

Application August 29, 1944, Serial No. 551,763

2 Claims. (Cl. 88—14)

(Granted under the act of March 3, 1883, as amended April 30, 1928; 370 O. G. 757)

This invention relates to instruments for measuring the degree of translucency of desired media with respect to a selected standard, the standard being variable as desired and in accordance with the relative translucency of the medium under test. Although the instrument is specifically designed for measurement of light transmission through a liquid or gas in which it is submerged, it will be recognized that certain principles thereof are equally applicable to non-submerged use and to the testing of solid specimens, smoke detection, etc.

An important object of the present invention is to provide such a device incorporating novel means for calibrating the point of maximum transparency, such calibrating means being mechanical in nature and of simple and reliable but extremely accurate nature.

Another object is to provide such a device which is readily portable, which incorporates a sensory portion hermetically sealed and adapted to be submerged in the material to be tested and electrically connected to a separately encased indicating portion adapted to be located at a remote point or at any desired location to afford continuous and accurate indication of ambient translucency without adjustment or computation.

Another object is to provide such a densitometer so designed that the calibration thereof may be quickly and easily changed by the operator in such manner that the limits of its indicating range may extend either from (1) perfect transparency on one extreme to total opacity on the other; or (2) from one to another of certain arbitrary limits chosen for the requirements of a specific activity, either or both extremes being short of complete transparency or opacity. A related object is to provide such a densitometer which affords full scale deflection of the indicating instrument in either of the two cases noted.

A further object is to provide such an instrument which may be moved about in a large body of liquid, indicating at all times the translucency or fluctuations of translucency at the position of the sensory element of the instrument. This will be recognized as particularly useful in that stratification and variations in the thicknesses of strata are common in streams, harbors, settling basins and the like.

Still another object is to provide such an instrument which may easily be checked and corrected against a chosen standard, and by means of which correct readings may be made by persons relatively unskilled technically.

Still another object is to provide such an instrument which affords an indication of transparency adapted to be interpreted in terms of the combined turbidity and light diffusion which determine the distances at which photographs may be made under water.

Referring now to the drawing:

Fig. 1 is a perspective view of the complete and encased sensory mechanism and the connecting cable assembly by which it is coupled to the indicator mechanism;

Fig. 2 is a perspective view of the indicator mechanism;

Fig. 3 is a diagrammatic view of the optical and electrical components of the entire system;

Fig. 4 is a longitudinal sectional view of the sensory mechanism taken along the optical axis;

Fig. 5 is a detail bottom plan view of the lamp socket and its adjustable supporting means, taken as indicated by the line and arrows 5—5 of Fig. 4;

Fig. 6 is a cross sectional view taken substantially on the line 6—6 of Fig. 4 and looking in the direction of the arrows; and Fig. 7 is a perspective view of the calibrating shutter and adjusting means therefor, removed from the remainder of the mechanism.

Referring now to the drawing, it will be observed that the complete instrument comprises two independent but electrically connected sections, viz: the sensory or control housing containing the photo-electric cells and light source, and which is adapted to be submerged in the material to be tested (this portion of the instrument being illustrated in Figures 1 and 4) and the instrument or indicator housing, shown in Fig. 2, which although electrically connected to the sensory housing is adapted to be placed at a point where it may be conveniently observed by the operator.

As best shown in Fig. 4, the sensory housing comprises a pair of spaced casing sections 2, 4 of watertight construction. These are rigidly connected in spaced and axially aligned relationship by rigid bars 5 shown as of angle section, and by a tube 6 which also serves as a wire conduit. The main portion of each casing section is of substantially cylindrical form, the sections being mounted coaxially, on the optical axis of the assembly. Each section has a pressure-tight window as 8, 8A, one window facing the other. Casing section 2 houses an incandescent lamp 10, a photo-cell 12, and an interposed heat and light absorbing filter 13. A collimating lens system 14 is arranged between the lamp 10 and the window 8.

On either side of and close to the lamp 10 are apertured partitions 15, 16, each having an aperture barely large enough to pass the useful light. These will be seen to prevent any light from a source not located near the optical axis from reaching the photoelectric cell 12. Two such diaphragms are used, one to supplement the cutoff of the other, for the reason that it is not possible to locate a diaphragm at the focal point of the lens system 14.

The lamp socket 11 is movably mounted in such manner as to permit universal adjustment of the positioning of the bulb, to aid in focusing the light beam and directing it toward and into the window of the opposite casing section 4. The lamp socket is supported by three equally spaced screws 17, extending vertically through its base flange 11a and threaded in an insulating ring 3 removably held in appropriate position against an opening (undesignated) in the bottom of casing section 2 by screws 3A having offset heads and rotatable to release or retain the ring and the socket carried thereby. The screw holes in the socket base flange 11a are of such size and shape as to permit the socket to be cocked in any direction by unequal adjustment of the screws 17, and the socket is of course also movable vertically with adjustment of the screws. Unwanted displacement of the socket with respect to the screws is prevented by springs 18 on the screws.

Light entering the sensory cell casing section 4 is brought to focus by condensing lens 24. Also located in this housing is a partition 25 having an aperture located at the focal point and barely large enough in diameter to admit the image of the lamp filament, and thereby acting to exclude light transmitted from all other directions than along the optical axis. The divergent light beam is then directed upon the active surface of the photoelectric cell 22, which constitutes the sensory cell. The output and resistance of this cell will be seen to vary with changes of transparency of the substance or material interposed between the windows 8, 8A. A gate-type shutter 27 is so located between the condensing lens 24 and diaphragm 25 that the gate, by adjustment, may be made to cut off any desired portion of the light normally reaching the photoelectric cell 22. Adjustment of the position of the gate is effected by means of a threaded shaft 28 having a squared end accessible from outside the casing upon removal of a water-tight plug 30. A traveller nut 29 on the threaded shaft 28 actuates an arm 26 fast upon the gate shaft, to adjust the gate when shaft 28 is turned.

The density of filter 13 is so selected that light losses therethrough exceed the total losses in all condenser and collimator lens combinations and windows. The outputs of the photoelectric cells, 12, 22, which are identical, are accordingly unequal unless a portion of the light trained upon photocell 22 is cut off by the shutter 27. Referring to Fig. 3 it will be seen that the photocells are connected in series. The potential difference between their connecting wires 20 will accordingly be immeasurable when the cells are equally excited. As pointed out above, such equal excitation is effected in the initial adjustment of the apparatus, by adjustment of the gate 27. If the light reaching the photocell 22 is reduced by reason of a reduction of transparency of the medium or object between the windows 8, 8A, however, the resistance of the sensory cell 22 rises proportionately, and a potential difference appears between the connecting wires 20. Such potential difference may be measured by a microammeter 33 contained in the instrument casing and connected to the wires 20 by conductors 21, which may extend through the cable 9 illustrated in Figs. 1 and 4. A relatively high shunt resistance 31 is connected across the wires 20 and the microammeter, the resistance across wires 20 being variable by means of the adjustable tap 32. Adjustment of tap 32 varies the response of the microammeter. This permits adjustment of the sensitivity of the microammeter over a wide range, and this meter may in this manner be made to come to zero either upon a complete blackout of the photocell 22, or upon the transmission of any desired amount of light, such as that passed by an arbitrary standard. A complete blackout of the sensory cell sets up maximum current flow to the indicating instrument and of course maximum deflection. This point is marked "zero." Conversely, the position of the pointer when no current is applied is marked 100%, or any convenient arbitrary marking according to the application of the instrument. Thus the indication of the instrument increases, logically, with the clarity of the medium under test, although calibration in the reverse manner might of course be used without changing the basic operation of the system.

Where the device is to be used in gauging the translucency of liquids, the sensory system assembly illustrated in Figs. 1 and 4, may be supported by the electric cable 9, and simply lowered into the liquid. The cable is located off center with respect to the assembly so that the unit will hang at an angle, the resultant sloping of the windows 8, 8A, tending to prevent the accumulation of dirt and air bubbles. The unit may be used in any desired position, however, and upon the opposite end of the assembly a ring as 35 may be provided to permit the unit to be slung in horizontal position as for working close to the bottom where this is desired.

The invention herein described may be manufactured and used by or for the Government of the United States of America for governmental purposes without the payment of any royalties thereon or therefor.

I claim:

1. A densitometer comprising a pair of hollow cell housings, each having a fluid-tight window in one wall thereof, a tubular casing connecting said pair of housings together in spaced relationship with the windows facing each other, said casing being connected to said housings at points substantially laterally spaced from the central longitudinal axis there-between, a pair of rigid bars also securing said housings together and connected thereto at points on the opposite side of such longitudinal axis, an optical system comprising a pair of light sensitive cells, one cell being located in each of said cell housings, a source of light located in one of said cell housings along with one of said cells, but spaced therefrom and located intermediate said cells and disposed upon an optical axis between said cells, said optical axis extending intermediate said tubular casing and said rigid bars; means for indicating differences in the amounts of light reaching said cells comprising an electrical indicator means, a comparison circuit comprising wires extending from said electrical indicator means into one of said housings, some of said wires being connected to the cell in said housing, the other wires extending through said tubular casing to said other cell in said other housing; a lens system positioned in said one cell housing on said optical axis and intermediate said source of light and the housing window for projecting a collimated beam of light from said source of light through the space between said cell housings, said lens system comprising a collimating lens spaced from the light source a distance substantially equal to the focal length of said lens, a condensing lens positioned on said optical axis in the other cell housing, said condensing lens being spaced from the cell in said other housing a distance substantially exceeding its focal length, a light intercepting partition in said other cell housing intermediate the cell and said condensing lens and located at substantially the focal point of said condensing lens, said partition having an aperture on said optical axis of dimensions not substantially greater than those of the cross-sectional area of the focused beam at said focal point, a shutter adjacent said partition positioned to intercept a part of the light beam, said shutter being mounted for pivotal adjustment to vary the size of the intercepted part of the beam and means adjacent the source of light and within the cell housing containing said collimating lens for preventing light transmitted through said collimating lens from sources substantially spaced from the said optical axis from reaching the cell in said housing.

2. As a unitary article, a densitometer comprising a pair of hollow cell housings, each having a fluid-tight window in one wall thereof, a tubular casing connecting said pair of housings together in spaced relationship with the windows facing each other, said casing being connected to said housings at points substantially laterally spaced from the central longitudinal axis therebetween, a pair of rigid bars also securing said housings together and connected thereto at points on the opposite side of such longitudinal axis, an optical system comprising a pair of light sensitive cells, one cell being located in each of said cell housings, a source of light located in one of said cell housings along with one of said cells, but spaced therefrom and located intermediate said cells and disposed upon an optical axis between said cells, said optical axis extending intermediate said tubular casing and said rigid bars; means for indicating differences in the amounts of light reaching said cells comprising a separate housing, an electrical indicator means in said separate housing, a cable connecting said indicator housing to one of said cell housings at a point laterally spaced from said optical axis, a comparison circuit comprising wires extending from said electrical indicator means through said cable into one of said housings, some of said wires being connected to the cell in said housing, the other wires extending through said tubular casing to said other cell in said other housing; a lens system positioned in said one cell housing on said optical axis and intermediate said source of light and the housing window for projecting a collimated beam of light from said source of light through the space between said cell housings, said lens system comprising a collimating lens spaced from the light source a distance substantially equal to the focal length of said lens, a condensing lens positioned on said optical axis in the other cell housing, said condensing lens being spaced from the cell in said other housing a distance substantially exceeding its focal length, a light intercepting partition in said other cell housing intermediate the cell and said condensing lens and located at substantially the focal point of said condensing lens, said partition having an aperture on said optical axis of dimensions not substantially greater than those of the cross-sectional area of the focused beam at said focal point, a shutter adjacent said partition positioned to intercept a part of the light beam, said shutter being mounted for pivotal adjustment to vary the size of the intercepted part of the beam and means adjacent the source of light and within the cell housing containing said collimating lens for preventing light transmitted through said collimating lens from sources substantially spaced from the said optical axis from reaching the cell in said housing.

JESSE EDWARD MacADAMS.

REFERENCES CITED

The following references are of record in the file of this patent:

UNITED STATES PATENTS

| Number | Name | Date |
|---|---|---|
| 2,073,223 | Rose | Mar. 9, 1937 |
| 2,394,129 | West | Feb. 5, 1946 |
| 2,147,156 | Geffcken et al. | Feb. 14, 1939 |
| 1,746,616 | Sounitza | Feb. 11, 1930 |
| 2,064,517 | Brice | Dec. 15, 1936 |
| 2,123,573 | McFarlan et al. | July 12, 1938 |
| 2,324,304 | Katzman | July 13, 1943 |

FOREIGN PATENTS

| Number | Country | Date |
|---|---|---|
| 389,599 | Great Britain | Mar. 23, 1933 |

OTHER REFERENCES

Radio News for June, 1944; page 60 cited. (Copy in Scientific Library, U. S. Patent Office.)